United States Patent [19]
Colburn

[11] Patent Number: 5,160,039
[45] Date of Patent: Nov. 3, 1992

[54] BIO-TUBE AQUATIC FILTER
[76] Inventor: Perry Colburn, 15386 Little Valley Rd., Grass Valley, Calif. 95949
[21] Appl. No.: 771,742
[22] Filed: Oct. 4, 1991
[51] Int. Cl.$^5$ .............................................. C02F 3/06
[52] U.S. Cl. ................................. 210/150; 210/169; 210/416.2; 210/446; 210/508
[58] Field of Search ............... 210/150, 151, 169, 335, 210/416.1, 416.2, 446, 448, 449, 460, 496, 504, 505, 508

[56] References Cited
U.S. PATENT DOCUMENTS

| | | | |
|---|---|---|---|
| 2,533,936 | 12/1950 | Holmes et al. | 210/169 |
| 2,670,851 | 3/1954 | Curtis | 210/508 |
| 3,238,124 | 3/1965 | Burton | 210/615 |
| 3,417,013 | 12/1968 | Roberts | 210/508 |
| 3,700,590 | 8/1970 | Burton | 210/615 |
| 3,899,424 | 8/1975 | Lake | 210/169 |
| 4,072,612 | 2/1978 | Daniel | 210/416.2 |
| 4,163,035 | 7/1979 | Gorsky | 210/169 |
| 4,263,142 | 4/1981 | Burton | 210/615 |
| 4,411,780 | 10/1983 | Suzuki et al. | 210/150 |
| 4,622,148 | 11/1986 | Willinger | 210/150 |
| 4,708,792 | 11/1987 | Takarabe et al. | 210/150 |
| 4,717,519 | 1/1988 | Sagami | 264/103 |
| 4,750,863 | 6/1988 | Scoggins | 55/385.2 |
| 4,802,980 | 2/1989 | Gilkey et al. | 210/416.2 |
| 4,810,385 | 3/1989 | Harter et al. | 210/606 |
| 4,908,128 | 3/1990 | Chiba | 210/150 |
| 5,006,238 | 4/1991 | Tominaga | 210/169 |

FOREIGN PATENT DOCUMENTS

| | | |
|---|---|---|
| 0359969 | 3/1990 | European Pat. Off. . |
| 3812149 | 10/1989 | Fed. Rep. of Germany . |
| 1218690 | 8/1989 | Japan . |

Primary Examiner—Stanley S. Silverman
Assistant Examiner—Christopher Upton
Attorney, Agent, or Firm—John P. O'Banion

[57] ABSTRACT

An aerobic bacteria filtration apparatus for aquatic ponds. A generally cylindrical tube houses a plasticized media derived from horse hair or hog hair which is suitable for supporting the growth of colonies of aerobic bacteria. An intake port coupled to one end of the tube permits water from the aquatic pond to be drawn across the plasticized media by means of a submersible pump which is coupled to the other end of the tube. The aerobic bacteria digests and degrades waste products suspended in the water as it is drawn across the plasticized media, and the cleansed water is discharged into the aquatic pond. A plurality of tubes containing the plasticized media can be connected in a manifold configuration to increase the filtration capability for large bodies of water.

13 Claims, 3 Drawing Sheets

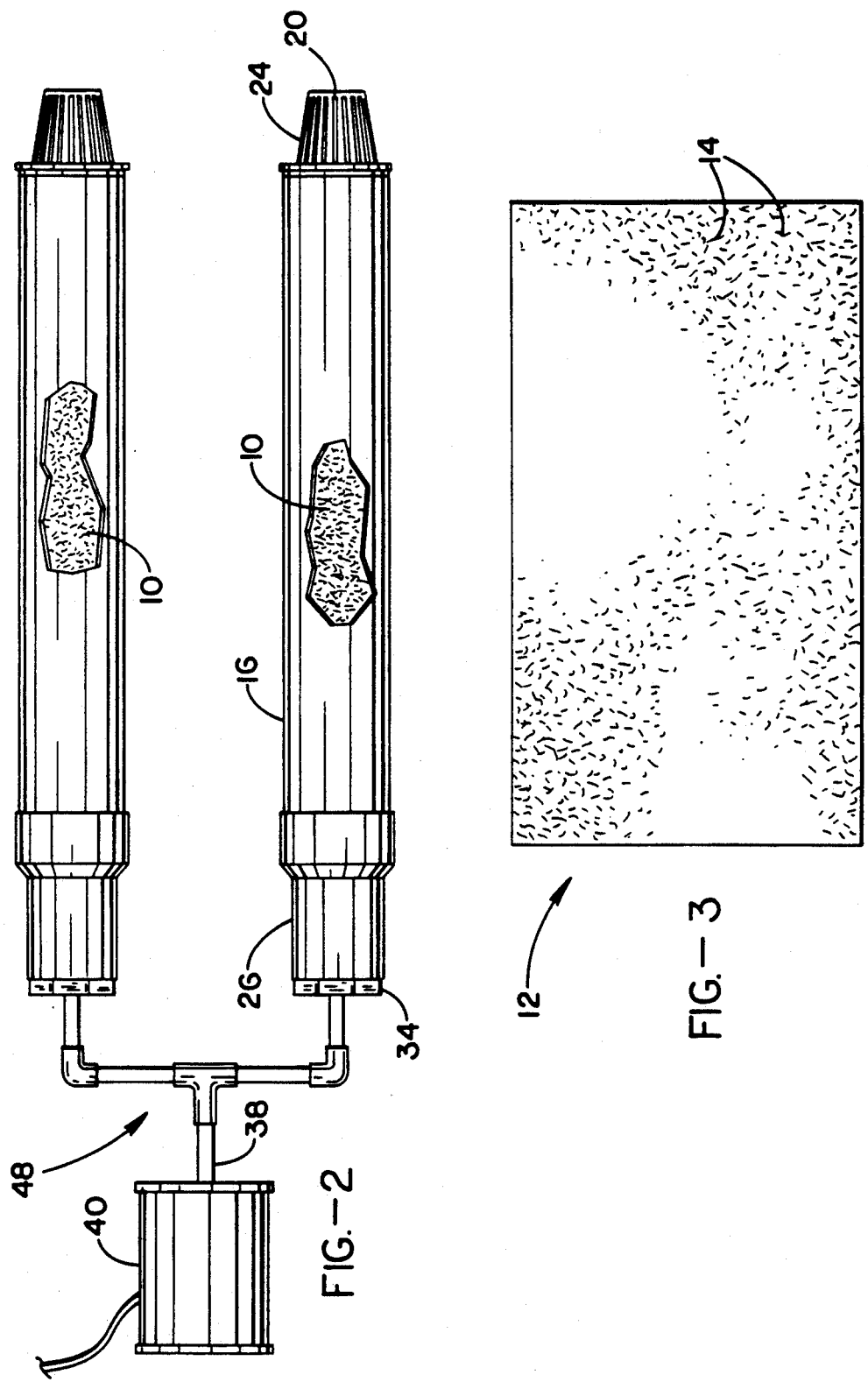

BIO-TUBE AQUATIC FILTER

BACKGROUND OF THE INVENTION

1. Field of the Invention

This invention pertains generally to systems for filtering water, and more particularly to an apparatus for cleansing water in aquatic ponds through the use of aerobic bacteria supported in a plasticized media.

2. 2 Description of the Background Art

Aerobic chambers have been widely used in the treatment of sewage and other liquid or liquified wastes. By diffusing air into the treatment chamber, conditions are created which promote the growth of aerobic bacteria which is efficient at digesting and degrading a variety of influent wastes.

It is also known that the efficiency of an aerobic treatment chamber can be increased by placing a bacteria support medium therein. Typical support media include a plurality of discrete irregularly shaped bodies, similar bodies of regular shape which are loosely packed, honeycombed structures, sheets of tangled rigid plastics, wire-like filaments or strips, gravel, and other solid media through which liquids can flow. As the surface area of the support medium increases, more bacteria can be supported because of the higher ratio of surface area to volume.

U.S. Pat. No. 4,717,519 issued to Sagami on Jan. 5, 1988, discloses a bacteria bed for use in an aeration tank. The bacteria bed contains multiple loops of fiber made from a thermoplastic material such as polyvinylidene chloride which has a high bacteria holding area. U.S. Pat. No. 4,810,385 issued to Hater et al. on Mar. 7, 1989, discloses a sock fabricated from a coarse, porous material such as burlap or canvas, or using a plastic container with openings, to house a bacterial culture for degrading waste or other compounds in a collection system. U.S. Pat. No. 4,908,128 issued to Chiba on Mar. 13, 1990, discloses using plasticized filaments to form a support medium for bacteria in sewage treatment plants. Two separate media having different surface area to volume ratios are assembled to form a bacteria bed. The media are selected to have open weaves which are more conducive to growth of higher order bacteria which are able to digest sludge of lower order micro-organisms. U.S. Pat. No. 4,263,142 issued to Burton on Apr. 21, 1981, discloses a filtration system having a plurality of cartridge filters buried in the soil. Each cartridge is cylindrical in shape and has end caps, one end cap having an inlet line and the other having an outlet line. The end walls also have multiple holes through which clusters of bark fibers project. Influent water passes through the bark fibers which serve to attract and hold nutrient deposition in the water in the form of colloidal wastes, single-celled bacteria, phytoplankton and the like while at the same time providing a safe habitat for minute animal organisms capable of feeding thereupon. Japanese No. 1,218,690 discloses a filtration systems that uses anaerobic bacteria.

U.S. Pat. No. 4,411,780 issued to Suzuki et al. on Oct. 25, 1983, discloses a sewage disposal plant using fibrous filters. U.S. Pat. No. 3,700,590 issued Oct. 24, 1972, discloses a system to separate organic solids from liquid waste using micro-biological communities and fibrous filters. U.S. Pat. No. 3,238,124 issued to Burton on Mar. 1, 1966, discloses a method and apparatus for treating waste liquids using fibrous filters. EPO 359,969 discloses fluid filtration using plastic strips coated with active carbon and bacteria bunches. German 3,812,149 discloses filtration by repeatedly pumping liquid through bacteria-holding inserts.

The foregoing patents disclose a variety of methods and systems for liquid filtration and biological control of waste. Those methods and systems are, however, bulky and expensive for use in aquatic ponds commonly used in landscaping, and some present hazards to fish and wildlife. There is, therefore, a need for a simple, reliable, inexpensive and environmentally safe filtration device for use in aquatic ponds, which utilizes high concentrations of aerobic bacteria to digest or degrade waste products. The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's invention herein.

SUMMARY OF THE INVENTION

The present invention pertains generally to an aerobic bacteria filtration system for aquatic ponds used in landscaping. The apparatus of the present invention generally comprises a hollow plastic tube which is environmentally safe to fish and other wildlife, with a submersible pump coupled to one end and a slotted atrium grate coupled to the other end. Water is drawn into the tube through the slots in the atrium grate and discharged by the pump. This permits circulation of the water.

Filtration is accomplished by the use of a horse hair or hog hair plasticized media which will support the growth of a considerable number of colonies of aerobic bacteria. A rectangular-shaped pad of the plasticized media is cut, rolled like a blanket, and inserted into the tube. Because the material is fibrous, the surface area to which bacteria can attach is three to five times greater than other filter materials. This configuration also permits a high surface area media to fit into a small housing.

Aerobic bacteria will naturally grow and locate itself on the fibers of the plasticized media. These bacteria are naturally occurring and digest lower order organisms in the water to provide filtration. To speed the charging of the filter, the filter material can be inoculated with bacteria cultures or bacteria cultures can be added to the water to be filtered. The filtration effect is then much like natural filtration in a flowing stream of water.

An object of the invention is to provide a compact, cost-effective, and efficient filtration system for use in aquatic ponds.

Another object of the invention is to simulate, in an aquatic pond, the natural filtration which occurs in a flowing stream of water.

Another object of the invention is to provide for high concentrations of aerobic bacteria in small volumes of filter media.

Further objects and advantages of the invention will b brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 shows the apparatus of FIG. 1 assembled in a manifolded configuration.

FIG. 3 is a top plan view of a sheet of the filter media used in the apparatus shown in FIG. 1.

DESCRIPTION OF THE PREFERRED EMBODIMENTS

Figure 1:
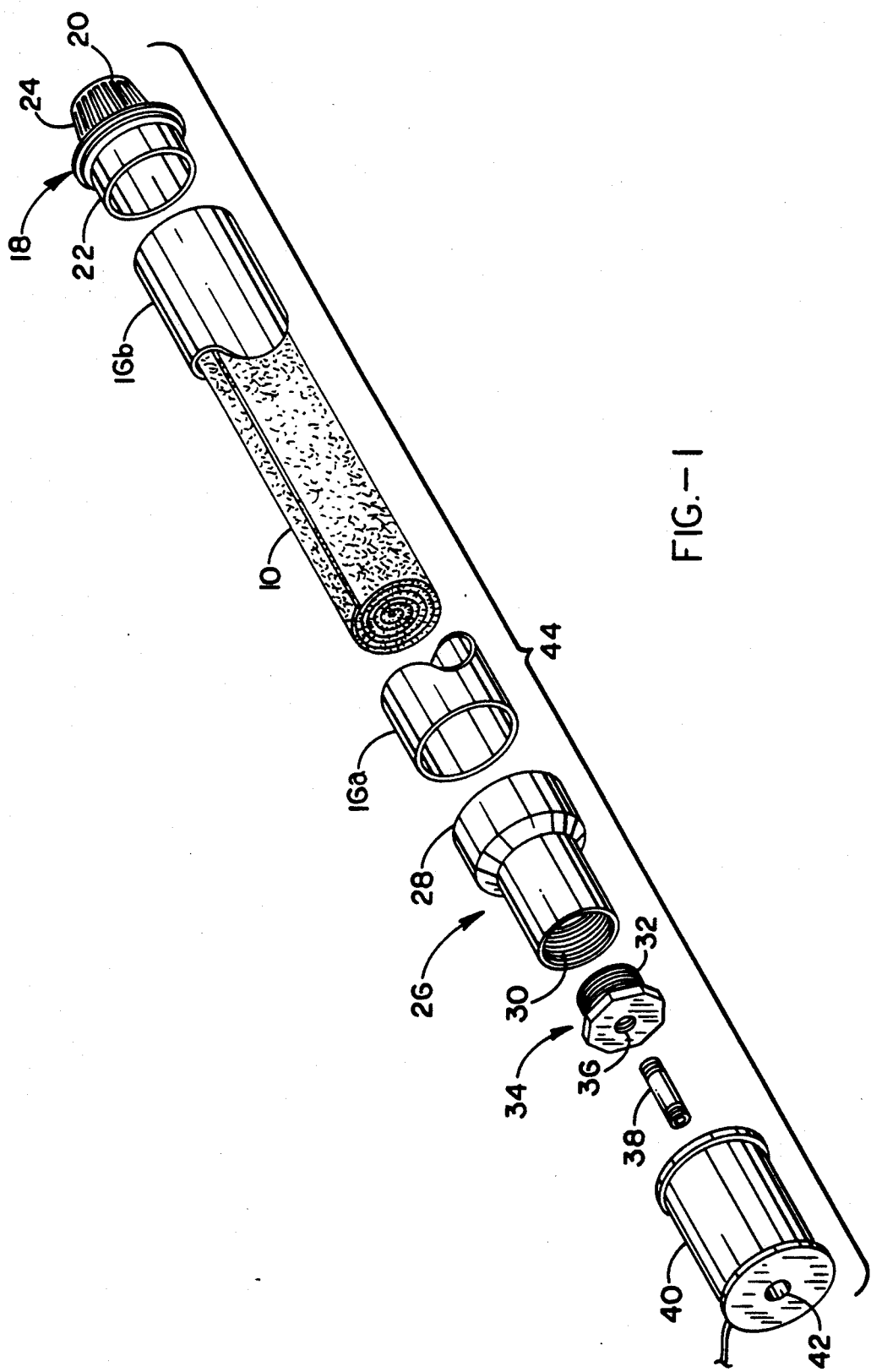
FIG. 1 is an exploded perspective view of the apparatus of the present invention.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Referring to FIG. 1 and FIG. 3 together, the present invention includes filter media 10 which is adapted for us by rolling a generally rectangular planar sheet 12 of filter media 10 as shown. Filter media 10 typically comprises a hog hair or horse hair plasticized media having a plurality of fibrous strings or filaments 14. Effectiveness of the apparatus is enhanced to the extent that the number of filaments 14 and, therefore, the surface area of filaments 14 per square inch of filter media 10, is increased. Filter media 10 serves as a bacteria bed for supporting the growth of naturally occurring aerobic bacteria. Suitable materials from which filter media 10 can be formed include Dura-last fiber media part numbers R-125, R-130, and R-225. These products primarily comprise hog hair coated with neoprene plastic, with a density of approximately three ounces per square foot providing 150 to 200 fibers per cubic inch. Neoprene coated animal hair provides a non-toxic media which is compatible with aerobic bacteria cultures. Nylon or woven neoprene or similar plastic fibrous material, such as Silverstone model number 380 interwoven fiber plastic (pot scrubber for teflon pans), could also be used. Additionally, if increased rigidity is desired, filter media 10 can be coated with a neoprene or polyethylene construction cloth.

Referring to FIG. 1 and 2 together, filter media 10 is enclosed by housing 16 which typically comprises a hollow tube made from polyvinylchloride or a similar plastic material which is not hazardous to fish or wildlife. Housing 16 is preferably cylindrical in shape to correspond to the rolled cylindrical shape of filter media 10, and to provide for high levels of suction and even circulation of water.

Coupled to the distal end 16b of housing 16 is end cap 18 which includes a plurality of slots 20 positioned around its surface. End cap 18 includes a neck portion 22 which is inserted into the distal end 16b of housing 16, and a conical tapered portion 24 which, in combination with slots 20, serves as an intake port.

Coupled to the proximal end 16a of housing 16 is threaded adapter 26 which includes flange 28 which fits over proximal end 16a, and threads 30 which receive threads 32 on reducing adapter 34. Reducing adapter 34 includes threads 36 which receive threaded coupling 38 which is in turn coupled to submersible pump 40. Submersible pump 40 includes an outlet 42 which serves as the discharge port.

Figure 4:
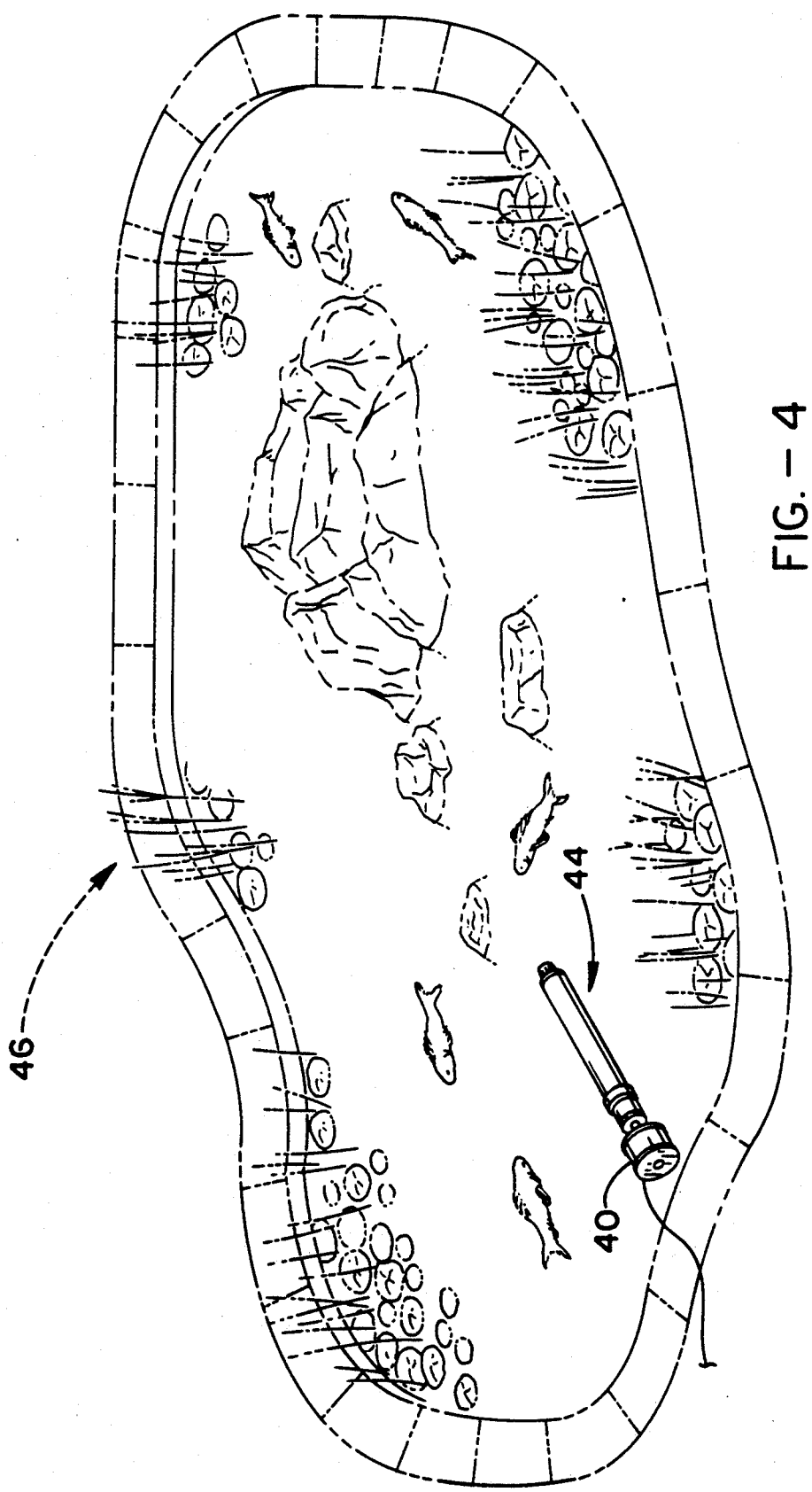
FIG. 4 shows the apparatus of FIG. 1 installed in an aquatic pond depicted in phantom.

Referring now to FIG. 1 and FIG. 4 together, aerobic filter 44 is typically placed into an aquatic pond 46. Submersible pump 40 draws water from aquatic pond 46 into slots 24 in end cap 18. The water is drawn across filter media 10, cleansed of sediment, sludge, low order micro-organisms, and the like, and discharged back into aquatic pond 46 through outlet 42.

The cylindrical design of housing 16 permits high levels of suction to be effected by submersible pump 40, thereby creating better overall circulation of the water. By increasing the circulation, greater amounts of decomposing matter suspended in the water can be drawn into filter media 10 to cleanse the water. Not only does filter media 1 support aerobic bacteria which digests lower order micro-organisms, but it serves as a vacuum cleaner bag for organic and inorganic particles suspended in the water. When the flow of water decreases, filter media 10 is removed from housing 16, cleaned, and reinserted.

Aerobic bacteria which will digest lower order microorganisms will naturally grow in filter media 10 as water is circulated and oxygen is present. However, to accelerate the "charging" of aerobic filter 44, bacteria cultures can be added directly to the aquatic pond 46 or filter media 10 can be inoculated with bacteria cultures. Particularly well suited to this application is Environmental Alternatives OSWD-AQUA-5 organic sludge and waste digesting bacteria culture with enzymes. This product contains a total bacteria count of 200 billion per gallon (3.79 liters), and includes Bacillus Subtilis, Bacillus Lichenformis, Bacillus Megaterium, Nitrosomonas, and Nitrobacter. The enzyme content includes protease of 20 million per gallon (3.79 liters) and amylase of 2 million per gallon (3.79 liters). This combination provides for rapid nitrite control, thereby avoiding "anoxia" or brown blood disease in fish.

Referring also to FIG. 2, for aquatic ponds 46 which contain three hundred to four hundred gallons (1135 to 1514 liters) of water, housing 16 would typically be four inches (10 cm) in diameter. By increasing the diameter of housing 16 to approximately six inches (15 cm), it is possible to cleanse up to approximately six hundred gallons (2271 liters) of water. In the case of larger aquatic ponds, multiple aerobic filters 44 would be coupled together by means of a manifold 48 as shown in FIG. 2.

Accordingly, it will be seen that this invention utilizes high concentrations of naturally occurring aerobic bacteria to simulate natural filtration in flowing streams of water to provide an efficient, compact and environmentally safe filtration apparatus for aquatic ponds. Biological filtration occurs by exploiting the natural sequence of biochemical reactions that occur in the nitrogen cycle. Decomposition of waste materials by fungi and bacteria produces ammonia. The ammonia produced is broken down to nitrite by a number of different nitrifying bacteria, the most important of which is Nitrosomonas. A second group of nitrifying bacteria, principally Nitrobacter, converts the nitrite to nitrate. Both of these groups of bacteria are aerobic and require oxygen to thrive and thus purify the water. The bacteria grown on, and are supported by, a filter medium that provides a large surface area. The nitrates are then incorporated into plant protein, and the bacteria digest lower order micro-organisms in the water.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A submersible filtration apparatus for cleansing water in aquatic-ponds through the digestion of lower order micro-organisms by aerobic bacteria, comprising:
    (a) a generally cylindrical housing, said housing having a first end and a second end;
    (b) a submersible pump, said submersible pump coupled to said first end of said housing;
    (c) an intake port, said intake port coupled to said second end of said housing;
    (d) a discharge port, said discharge port coupled to said submersible pump; and
    (e) a cylindrical-shaped bacteria bed, said bacteria bed enclosed by said housing, said bacteria bed including a plurality of substantially concentric layers of plasticized filter media, said filter media including a plurality of fibrous filaments, said bacteria bed supporting the growth of aerobic bacteria for digesting lower order micro-organisms.

2. The apparatus recited in claim 1, wherein said intake port comprises a conically tapered end cap, said taper converging at the distal end of said end cap, said end cap including a plurality of openings.

3. The apparatus recited in claim 2, wherein said openings are elongated slots, said slots extending from said second end of said housing toward said distal end of said end cap.

4. The apparatus recited in claim 1, wherein said plasticized media is derived from horse hair.

5. The apparatus recited in claim 1, wherein said plasticized media is derived from hog hair.

6. An aerobic bacteria filtration apparatus, comprising:
    (a) an elongated housing, said housing having a first end and a second end;
    (b) a submersible pump, said submersible pump coupled to said first end of said housing;
    (c) an end cap, said end cap including a plurality of openings, sad end cap coupled to said second end of said housing;
    (d) a discharge port, said discharge port coupled to said submersible pump; and
    (e) a plasticized filter media of substantially cylindrical shape, said plasticized filter media including a plurality of generally concentric layers of fibrous filaments, said fibrous filaments supporting aerobic bacteria, said plasticized filter media enclosed by said housing, whereby said submersible pump draws water across said plasticized filter media thereby permitting said aerobic bacteria to digest lower order micro-organisms contained in said water.

7. The apparatus recited in claim 6, wherein said plasticized filter media is derived from horse hair.

8. The apparatus recited in claim 6, wherein said plasticized filter media is derived from hog hair.

9. The apparatus recited in claim 6, wherein said housing is a generally cylindrical tube.

10. The apparatus recited in claim 6, wherein said end cap is conically tapered, said taper converging at its distal end, said openings being elongated, said elongation extending from said second end of said housing toward said distal end of said ed cap.

11. An apparatus for filtering waste from aquatic ponds by aerobic bacterial digestion of lower order micro-organisms, comprising:
    (a) an elongated generally cylindrical housing, said housing having a first end and a second end;
    (b) a submersible pump, said submersible pump coupled to said first end of said housing;
    (c) an end cap, said end cap including a plurality of slots, said end cap coupled to said second end of said housing, said end cap including a conical taper;
    (d) a discharge port, said discharge port coupled to said submersible pump; and
    (e) a filter, said filter consisting of a plasticized filter media, said plasticized filter media including a plurality of rolled layers of fibrous filaments, said fibrous filaments supporting aerobic bacteria, said plasticized filter media enclosed by said housing.

12. The apparatus recited in claim 11, wherein said plasticized filter media is derived from horse hair.

13. The apparatus recited in claim 11, wherein said plasticized filter media is derived from hog hair.

* * * * *